United States Patent [19]
Kamiyama et al.

[11] Patent Number: 5,503,190
[45] Date of Patent: Apr. 2, 1996

[54] METHOD FOR REPAIRING A TUBULAR CONDUIT

[75] Inventors: Takao Kamiyama, Hiratsuka; Yasuhiro Yokoshima, Ibaraki, both of Japan

[73] Assignees: Shonan Gosei-Jushi Seisakusyo K.K., Kanagawa; Yokoshima & Company, Ibaraki, both of Japan

[21] Appl. No.: 128,969

[22] Filed: Sep. 30, 1993

[30] Foreign Application Priority Data

Oct. 9, 1992 [JP] Japan ................................. 4-271787

[51] Int. Cl.⁶ ...................................................... F16L 55/16
[52] U.S. Cl. .............................. 138/98; 138/108; 264/36
[58] Field of Search ............................. 138/97, 98, 108; 156/294, 287; 264/36

[56] References Cited

U.S. PATENT DOCUMENTS

| | | | |
|---|---|---|---|
| 3,880,176 | 4/1975 | Horne | 138/98 |
| 4,602,974 | 7/1986 | Wood et al. | 156/287 |
| 4,773,450 | 9/1988 | Stanley | 138/98 |
| 4,865,673 | 9/1989 | Shishkin et al. | 156/287 |
| 4,995,761 | 2/1991 | Barton | 138/98 |
| 5,009,715 | 4/1991 | Wilson | 134/22.11 |
| 5,101,863 | 4/1992 | Fujii et al. | 138/98 |
| 5,225,121 | 7/1993 | Yokoshima . | |

FOREIGN PATENT DOCUMENTS 60-242038  2/1995  Japan .

*Primary Examiner*—Timothy F. Simone
*Assistant Examiner*—James F. Hook
*Attorney, Agent, or Firm*—Lowe, Price, LeBlanc & Becker

[57] ABSTRACT

An improved method for repairing a utility pipe such as underground sewer pipe to internally line the pipe with a tubular liner impregnated with a thermosetting resin, and in this method, a hot water hose having ejection holes is inserted in the tubular liner bag to eject hot water to effect hardening of the thermosetting resin and this hose is provided with numerous floats to float in the water even when the ejected water collects and floods inside the tubular liner bag; thus, efficient shooting of the hot water from the hot water hose is secured.

10 Claims, 4 Drawing Sheets

METHOD FOR REPAIRING A TUBULAR CONDUIT

BACKGROUND OF THE INVENTION

1. Field of the Invention

The present invention relates to a method for repairing a tubular conduit by applying a lining material on the inner wall of the tubular conduit.

2. Description of the Prior Art

When an underground tubular utility conduit or an underground industrial tubular conduit, such as a sewer pipe, a gas pipe and an electric conduit pipe, becomes defective or very old, the pipe is repaired and reinforced without digging the earth to expose the pipe and disassembling the sections of the pipe. This non-digging method of repairing an underground pipe has been known and practiced in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air or water. The tubular liner bag is made of a flexible resin-absorbent material impregnated with a thermosetting resin, and has the outer surface covered with a hermetic plastic film. More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "reversing".) When the entire length of the tubular liner bag is reversed (i.e., turned inside out) into the pipe, the control rope holds the closed end of the tubular liner bag to thereby control the length of the tubular liner in the pipe. Then, the reversed tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

However, in this repairing method, when the fluid employed to reverse and fill and press outward the tubular lining bag is a liquid such as water, it is necessary to heat the entire body of the liquid, and this consumes a considerable amount of fuel or electricity as well as time, especially if the diameter of the pipe is large or the length thereof is large. Also, since this method uses a large volume of the liquid, it requires a large-sized boiler, hot water pump, heating and circulation installation, etc., and the cost for such facility will be significant and the time and area required for setting up such large facility will be also increased.

For this reason, an improved pipe repair method was proposed by one of the present applicants which matured into U.S. Pat. No. 5,225,121. According to this method, as shown in FIG. 6, the tubular lining bag 102 impregnated with a thermosetting resin is inflated inside the tubular pipe 101 by means of pressurized air, and at the same time a hot water hose 106 having a plurality of holes is inserted into the tubular lining bag 102, and the hot liquid is ejected radially from the hot water hose 106 via the holes to heat the tubular lining bag 102 to thereby harden the thermosetting resin impregnated in the tubular lining bag 102.

In this hot water ejection method, the tubular lining bag 102 pressed onto the inner wall of the tubular pipe 101 is supposed to be uniformly heated by the hot liquid ejected from the hot water hose 106, so that the thermosetting resin impregnated in this bag 102 should be uniformly hardened, and since the amount of ejected hot liquid may be relatively small the amount of electricity or fuel required to heat the liquid for ejection can be considerably smaller than that required to heat the entire body of the liquid filling the tubular bag; consequently, the boiler, hot water pump, and other heating and circulation facilities may be of small size and compact. Also, even if the pipe to be repaired is large in diameter or length, the repair can be conducted in a relatively short time and at relatively low cost.

Incidentally, when the lining bag 102 is heated, the thermosetting resin in it undergoes an exothermic reaction and becomes very hot, but the temperature does not overly exceed the boiling point of the liquid, since the ejected liquid applied to the inner wall of the lining bag 102 absorbs the heat from the bag 102 as the liquid is heated and eventually evaporates. Thus, the hot liquid ejected to the lining bag 102 at first functions as the starter for the exothermic reaction of the thermosetting resin, and then functions as the temperature stabilizer.

PROBLEMS THE INVENTION SEEKS TO SOLVE

However, in the above-described conventional method, the ejected liquid gathers and flows along the bottom of the tubular lining bag 102 inserted in the tubular pipe 101, and sooner or later the liquid floods the bottom of the tubular pipe 101 especially at a dip or lower reaches thereof, and the hot water hose 106 is drowned in the liquid at such locations, and fails to shoot out the hot liquid powerfully into the air to reach the inner wall of the tubular lining bag 102, especially the upper part thereof. As the result, those portions of the tubular lining bag 102 where the ejected hot liquid does not reach are late in hardening and when the hardening starts, the temperature stabilization effect of the ejected liquid cannot be obtained there, which may result in cracking and/or deformation of the lining layer 102.

The present invention was contrived in view of the above problems, and it is, therefore, an object of the invention to provide an improved method for repairing a tubular conduit by lining its inner wall with a thermosetting lining material and then heating the material to harden with hot liquid showering, which showering is effected in a manner such that the tubular lining material is showered with the hot liquid thoroughly throughout the entire length of the conduit, so that no part of the thermosetting lining material is slow in hardening but the hardening takes place uniformly and simultaneously, and furthermore, the excessive temperature increase due to the exothermic reaction of the thermosetting resin is checked without fail.

SUMMARY OF THE INVENTION

Means to Solve the Problems

In order to attain the above and other objects of the invention, there is provided an improved method for repairing a tubular conduit wherein the conduit is internally lined with a tubular lining material consisting of a resin-absorbent tubular liner and a thermosetting resin impregnated therein. This method comprises the steps of:

(a) preparing a hose which is closed at the front end, has a plurality of small holes distributed generally uniformly all over the working section of the hose such that when a pressurized liquid is sent into the hose the liquid is ejected from the holes generally radially, and has its working section provided with a float means which enables the entire length of the working section of the hose filled with the liquid to float in the same liquid to such an extent that a substantially large part of the hose comes above the liquid surface;

(b) inserting the hose into the tubular lining material so that the working section of the hose extends from one end to the other of the tubular lining material, which has its one end closed and has its inner side coated with a hermetic film;

(c) placing the tubular lining material in the conduit to penetrate through the conduit;

(d) inflating the tubular lining material with pressurized air; and (e) forcing into the hose the liquid of a temperature sufficiently high to cause the thermosetting resin to undergo exothermic reaction until this exothermic reaction initiated by the heat of the hot liquid ejected from the hose reaches completion.

The order of the steps (b) and (c) can be reversed.

In a common practice, the liquid employed to heat the thermosetting resin is water.

In a preferred embodiment, the float means comprises a string and a plurality of float pieces attached to the string at appropriate intervals, and the float means is wound spirally round the hose. The float pieces can be plastic foam such as styrene foam, or dried wood.

In another embodiment, the float means comprises a string made of plastic foam, and the plastic foam string is wound spirally round the hose.

It is also possible that the float means comprises a hollow tubular string of small diameter in which a compressed air is sealed, and the tubular string is wound spirally round the hose.

Or, the float means may comprise numerous rings of low specific gravity through which the hose is passed.

EFFECTS OF THE INVENTION

According to the invention, however high the ejected liquid may flood the bottom of the tubular lining bag, the hot water hose always floats in the liquid by virtue of the float means attached to the hose; therefore, the hose does not fail to shoot out the hot liquid powerfully enough into the air to reach the inner wall of the tubular lining bag throughout its entire length so that the tubular lining material is showered with the hot liquid thoroughly, and no part of the thermosetting lining material is slow in hardening and the hardening takes place uniformly and simultaneously; furthermore, the excessive temperature increase due to the exothermic reaction of the thermosetting resin is checked by the relative cooling effect of the ejected liquid without fail.

The above and other objects and features of the invention will appear more fully hereinafter in the following description given in connection with the accompanying drawings and the novelty thereof pointed out in the appended claims.

EMBODIMENTS

Next, an embodiment of the invention, which is considered the best mode, will be described with reference to the attached drawings.

Figure 1:
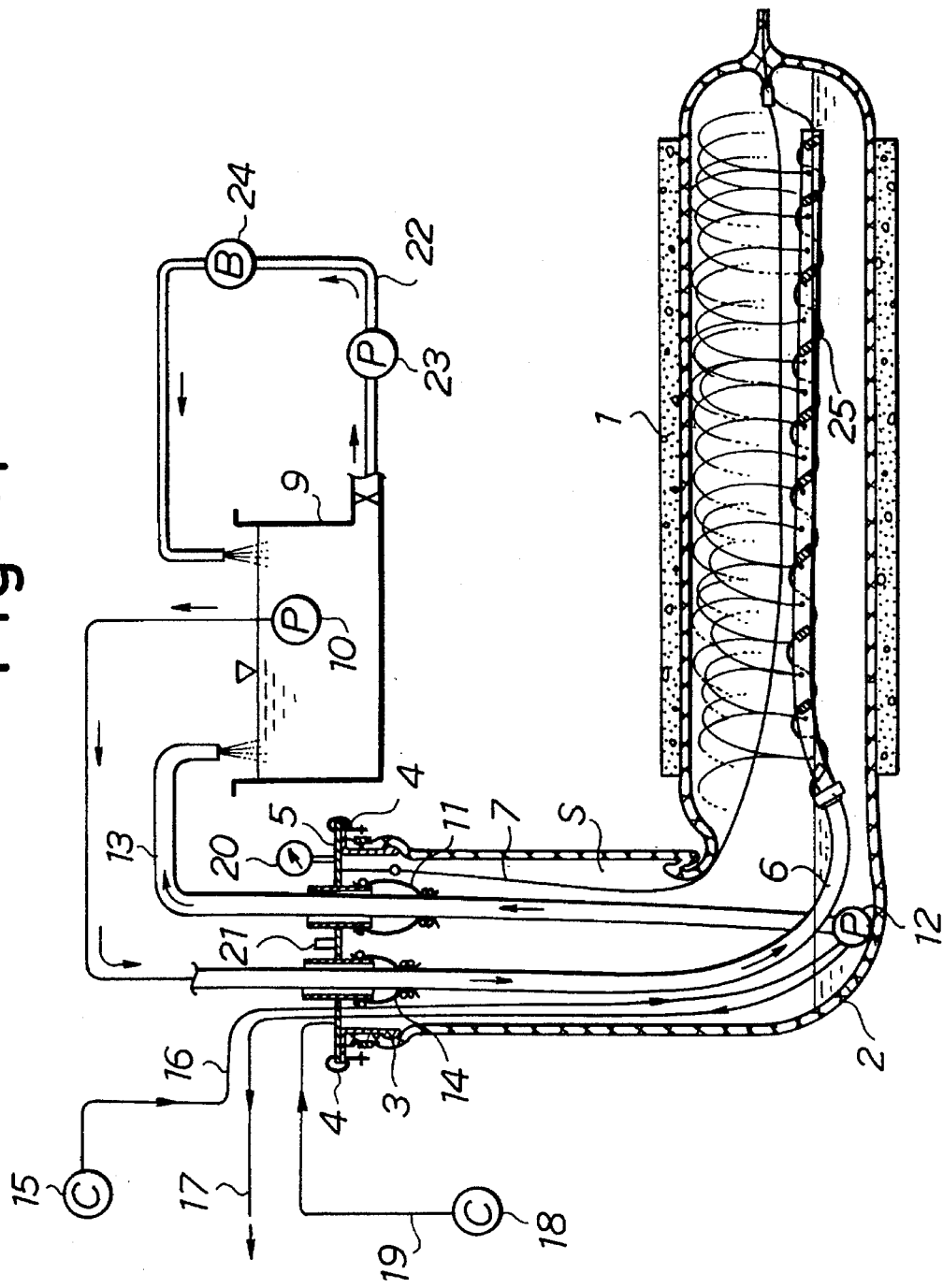
FIG. 1 is a vertical sectional view of a site of the pipe repair in which the method of the present invention is practiced.
Figure 2A:
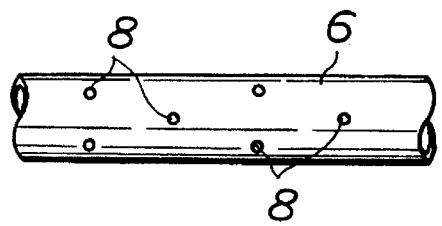
FIG. 2 is a partial top plan view of hot water hoses in two examples (a) and (b)
Figure 2B:
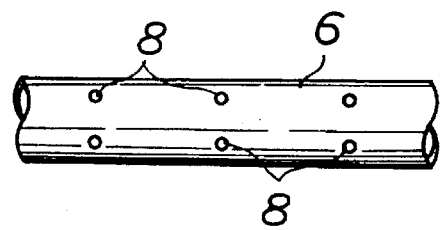
Figure 3:
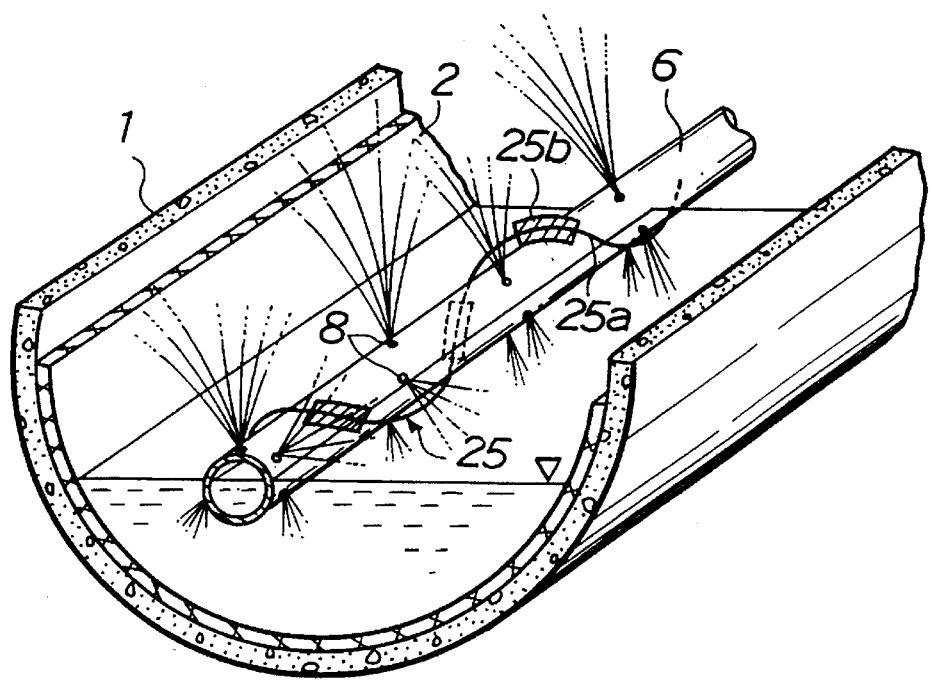
FIG. 3 is a sectional perspective view of a conduit to show an embodiment of the float means.
Figure 4:
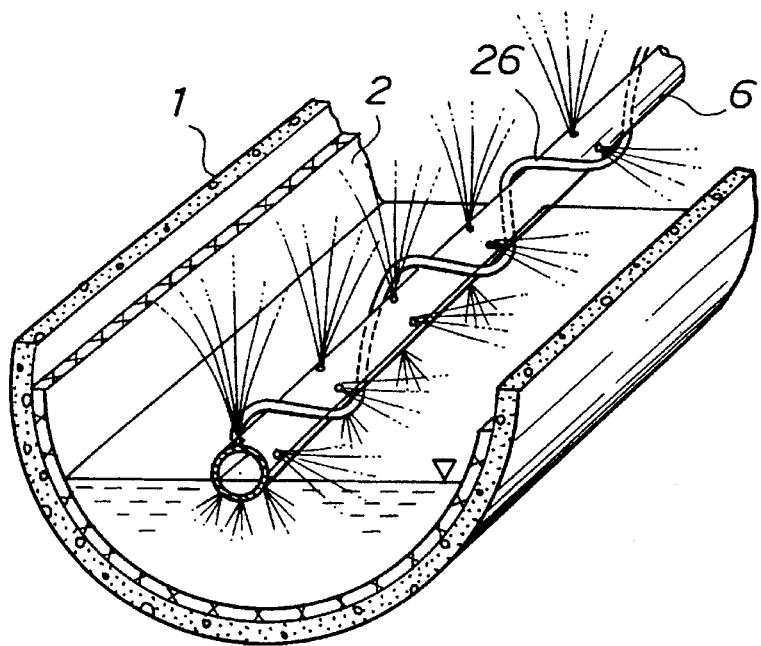
FIG. 4 is a sectional perspective view of a conduit to show an embodiment of the float means.
Figure 5:
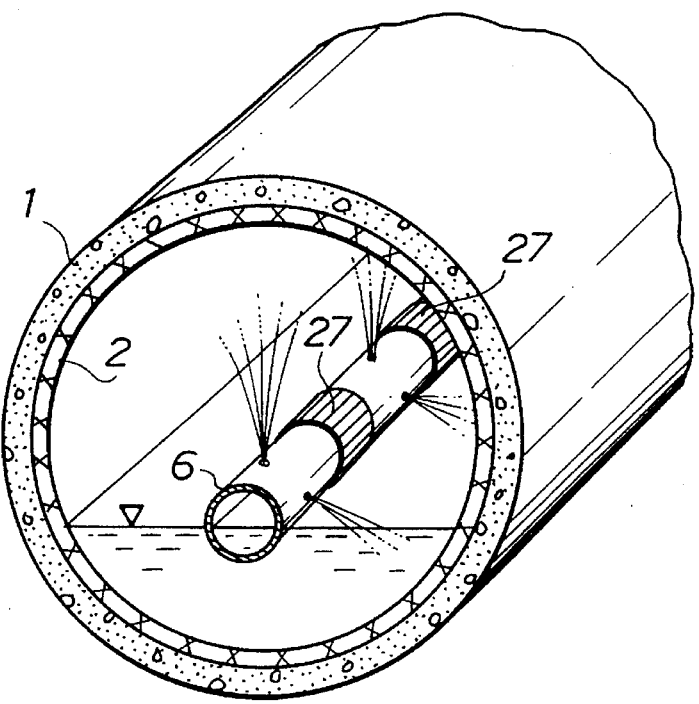
FIG. 5 is a sectional perspective view of a conduit to show an embodiment of the float means.

FIG. 1 is a vertical sectional view of a site of the pipe repair in which the method of the invention is practiced; FIG. 2 is a partial top plan view of hot water hoses; FIG. 3, FIG. 4 and FIG. 5 each are sectional perspective views of conduits to show embodiments of a float means in particular.

In FIG. 1, which schematically shows a site of the pipe repair operation, reference numeral 1 designates an underground sewer pipe, and in this pipe 1 is inserted a flexible tubular pipe liner bag 2. But, this pipe liner bag 2 itself must be described in detail first. A rectangular nonwoven resin-absorbable fabric of polyester felt is sewed into a tubular shape. The tubular pipe liner 2 is then impregnated with a thermosetting resin and is coated with an air- and water-tight film which hermetically covers at least the inner wall of the pipe liner 2. (This hermetic film may be made of urethan, polyester elastomer, or an organic silicon resin.) Incidentally, in this example, the pipe liner 2 is impregnated with the thermosetting resin before it is coated with the film and inserted in the pipe 1, but it is also possible to impregnate the pipe liner 2 with the thermosetting resin after the pipe liner 2 is coated with the film and inserted in the pipe 1.

As shown in FIG. 1, the tubular pipe liner bag 2 inserted in the pipe 1 has its one end closed, and the other end extends outside the vertical manhole, not shown, and mouths in it an annular fitting device 3 installed on the ground such that there occurs no leakage at this joint. Incidentally, the upper end of the fitting device 3 is closed hermetically with a lid device 5 which is fixed tightly by means of G clamps 4.

When the tubular lining material 2 is inserted into the tubular pipe 1, it pulls into the tubular pipe 1 a hot water hose 6 and a belt-type rope 7, whose front ends are connected to the front (closed) end of the tubular lining material 2 (that is, the right end of the lining material 2, as seen in FIG. 1). The belt-type rope 7 is provided for the purpose of flattening the bent of the tubular lining material 2, and another end of the rope 7 is attached to the lid device 5.

That portion of the hot water hose 6 which lies inside the tubular pipe 1 is punctured to have a plurality of holes 8 which are arranged uniformly and regularly all over the surface of the working portion of the hot water hose 6, as shown at (a) of FIG. 2 [or in another embodiment the holes 8 are arranged in a pattern as shown at (b) of FIG. 2.] These holes 8 enable the pressurized hot water in the hose 11 to shoot out to the inner wall of the tubular lining material 2. The other end of the hot water hose 6 penetrates the lid device 5 and extends out from the tubular lining material 2, and is connected to a hot water pump 10 provided in a water tank 9 installed on the ground. Incidentally, the lid device 5 is provided with flexible valves 11 and 14, and the hot water hose 6 penetrates the lid device 5 via the flexible valve 14, which is tightly adhered to the hot water hose 6 so as to prevent leakage.

The tubular lining material 2, the fitting device 3 and the lid device 5 cooperate to define a closed space S, and in this closed space S is installed a hot water pump 12, which is driven by means of compressed air. To the outlet port of this hot water pump 12 is connected one end of a discharge hose 13, and the other end of the hose 13 penetrates the lid device 5 via the flexible valve 11 to extend out of the space S and is opened over the water tank 9. Also, a compressor 15 is connected to the hot water pump 12 via a pipe 16 to supply compressed air to drive the hot water pump 12, and a pipe 17 leads out from the hot water pump 12 and penetrates the lid device 5 to extend out of the closed space S and opens in the atmosphere to let out the compressed air.

Another compressor 18 is installed on the ground, and a pipe 19 leads out from this compressor 18 and opens in the closed space S via the lid device 5 to supply compressed air to the closed space S. Incidentally, the lid device 5 is also equipped with a pressure gauge 20 and a safety valve 21.

A hot water pipe 22 leads out from the bottom of the water tank 9 and opens over the water tank 9 to form a circulatory passage. This water pipe 22 is equipped with a hot water pump 23 and a boiler 24.

In the present embodiment, as shown in detail in FIG. 3, a float means 25 is wound spirally round the hot water hose 6 over that length of the hose 6 which is inside the tubular pipe 1. This float means 25 consists of a rope 25a and a plurality of float pieces 25b, which are made of a material of low specific gravity such as plastic foam (e.g., styrene foam) and dried wood. The float pieces 25b are attached to the rope 25a at appropriate intervals.

Incidentally, as shown in FIG. 4, in another embodiment, a float means 26 may comprise a string made of plastic foam such as styrene foam, or it can be a hollow tubular string of small diameter in which a compressed air is sealed, and in either case the float means 26 is wound spirally round the hot water hose 6. Or, it is also possible to attach separate annular belt-like float pieces round the hot water hose 6 at appropriate intervals, as shown in FIG. 5. Or one may insert the hot water hose 6 through a numerous small-diameter doughnut-like rubber tubes filled with compressed air.

The air compressor 18 is driven and the compressed air created there is sent into the closed space S by way of the pipe 19; then, the internal pressure of the closed space S increases and the tubular lining material 2 is inflated with the compressed air and pressed against the inner wall of the tubular pipe 1, as shown in FIG. 1. Incidentally, the internal pressure of the closed space S is measured by means of the pressure gauge 20, and when the pressure exceeds a predetermined value, the safety valve 21 is operated to release some air so as to decrease the internal pressure of the closed space S. Thus, the internal pressure of the closed space S is maintained at a predetermined level.

Then, the hot water pump 23 and the hot water boiler 24 are switched on and the water in the water tank 9 is heated. When the water temperature becomes a predetermined high value, the hot water pump 10 in the water tank 9 is driven whereupon the hot water is sent into the hot water hose 6 and urged in the direction indicated by the arrows in the hose 6. Eventually, the hot water shoots out from the holes 8 made in the working portion of the hot water hose 6. The inner wall of the tubular lining material 2 is thus showered with the hot water, and the thermosetting resin impregnated in the tubular lining material 2 is heated and prompted to undergo an exothermic reaction with the result that the lining material 2 becomes very hot and hardens, whereby the inner wall of the pipe 1 is lined with a hardened lining material 2.

Figure 6:
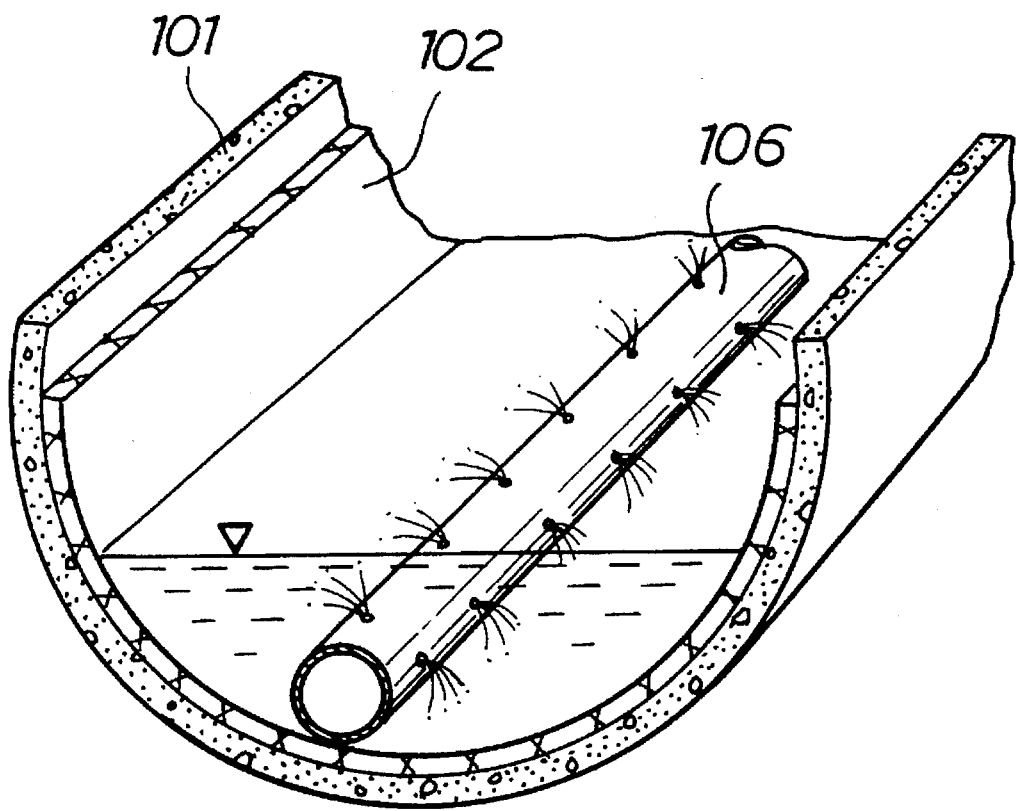
FIG. 6 is a sectional perspective view of a conduit wherein a conventional method is practiced.

Now, in a conventional method, a problem encountered in this operation was that the hot water hose 6 was soon drowned in the water pool in the bottom and failed to shoot the hot water to reach the upper part of the lining material 2. However, as described above, in this embodiment of the invention, the float assembly 25 is coiled round that portion of the hot water hose 6 which has punctured holes 8 for water ejection so that the said portion of the hose 6 is buoyed up at the water surface, as shown in FIG. 1 and FIG. 3, and does not sink in the water unlike the conventional hose 106 (FIG. 6). Therefore, however deep the water pool may become, the upper side of the floating hot water hose 6 is always exposed to the air and those holes 8 of the hot water hose 6 which are above the water level can allow the hot water to shoot out vigorously to reach the lining material 2 so that the upper part of the tubular lining material 2 is also heated without delay by the hot ejected water. As the result, the thermosetting resin impregnated in the tubular lining material 2 promptly undergoes exothermic reaction, and uniform and simultaneous hardening of the tubular lining material 2 is attained throughout the entire length of the pipe 1; thus, no cracking or deformation of the lining material occurs.

Furthermore, since the entire inner wall of the lining material 2, including the upper wall of it, is always wetted by the water from the hot water hose 6, the temperature of the lining material 2 does not overly exceed the boiling point of the water, since the water wetting the inner wall of the lining material 2 absorbs the heat from it as the water is heated and eventually evaporates.

Incidentally, the hot water that has heated and cooled the tubular lining material 2 falls to the bottom of the tubular lining material 2 to form the warm water pool, as shown in FIG. 1. This water is sucked and pushed up along the discharge hose 13 by the hot water pump 12 driven by means of the pressurized air supplied from the compressor 15, and poured into the water tank 9. The water in the water tank is continuously pulled by the hot water pump 23 and sent to the boiler 24 to be heated thereby to the predetermined high temperature and then returned to the water tank 9. Thus, the water in the tank 9 is kept circulating through the hot water pipe 22 to be heated by the boiler 24 so that the temperature of the water in the tank 9 is kept at the predetermined high temperature and this hot water is supplied to the tubular lining material 2 by way of the hot water hose 6. Therefore, the hot water is circulated within a closed circulatory system.

RESULT OF THE INVENTION

Thus, according to the invention, however high the ejected liquid may flood the bottom of the bag of tubular lining material, the hot water hose always floats in the liquid by virtue of the float means attached to the hose; therefore, the hose does not fail to shoot out the hot liquid powerfully enough into the air to reach the tubular lining bag throughout its entire length so that the tubular lining material is showered with the hot liquid thoroughly, and no part of the thermosetting lining material is delayed in hardening and the hardening takes place uniformly and simultaneously; furthermore, the excessive temperature increase due to the exothermic reaction of the thermosetting resin is checked by the ejected liquid without fail.

All the favorable results that are obtainable from the conventional method of hot water showering (such as energy saving, time saving, cost saving, simplification and downsizing of the heating and circulation facilities including the water tank 9, the hot water pump 10, and the boiler 24) are of course obtained in the operation of this embodiment of the invention in addition to the results of solving the new problems which motivated this invention.

While the invention has been described in its preferred embodiments, it is to be understood that modifications will occur to those skilled in the art without departing from the spirit of the invention. The scope of the invention is therefore to be determined solely by the appended claims.

What is claimed is:

1. A method for repairing a tubular conduit wherein the conduit is internally lined with a tubular lining material consisting of a resin-absorbent tubular liner and a thermosetting resin impregnated therein, comprising the steps of:

(a) preparing a hose, which is closed at the front end, has a plurality of small holes distributed generally uniformly all over a working section of the hose such that when a pressurized liquid is sent into the hose the liquid is ejected from the holes generally radially, and has its working section provided with a float means which enables the entire length of the working section of said hose filled with said liquid to float in the same liquid occupying said tubular conduit to such an extent that a substantially large part of the hose comes above the liquid surface;

(b) inserting said hose into said tubular lining material so that said working section extends from one end to the other of said tubular lining material, which tubular lining material has its one end closed and has its inner surface coated with a hermetic film;

(c) placing said tubular lining material in said conduit to extend throughout said conduit;

(d) inflating said tubular lining material with pressurized air; and (e) forcing into said hose liquid of a temperature sufficiently high to cause the thermosetting resin to undergo exothermic reaction, until this exothermic reaction initiated by the heat of hot liquid ejected from said hose reaches completion.

2. The method as recited in claim 1 wherein the step (b) is earlier than the step (c).

3. The method as recited in claim 1 wherein the step (c) is earlier than the step (b).

4. The method as recited in claim 1 wherein said liquid is water.

5. The method as recited in claim 1 wherein said float means comprises a string and a plurality of float pieces attached to the string at appropriate intervals, and said float means is wound spirally round the hose.

6. The method as recited in claim 5 wherein said float pieces are plastic foam.

7. The method as recited in claim 5 wherein said float pieces are dried wood.

8. The method as recited in claim 1 wherein said float means comprises a string made of plastic foam, and said plastic foam string is wound spirally round the hose.

9. The method as recited in claim 1 wherein said float means comprises a hollow tubular string of small diameter in which compressed air is sealed, and said tubular string is wound spirally round the hose.

10. The method as recited in claim 1 wherein said float means comprises numerous rings of low specific gravity through which the hose is passed.

* * * * *